United States Patent
Mizell et al.

(10) Patent No.: US 9,727,325 B2
(45) Date of Patent: Aug. 8, 2017

(54) METHOD FOR REPROGRAMMING A VEHICLE ELECTRONIC CONTROL UNIT

(71) Applicant: Powerteq LLC, Ogden, UT (US)

(72) Inventors: Christopher Mizell, Heathrow, FL (US); Victor Medina, Apopka, FL (US); Jacob Hoult, Orlando, FL (US)

(73) Assignee: Powerteq LLC, Ogden, UT (US)

( * ) Notice: Subject to any disclaimer, the term of this patent is extended or adjusted under 35 U.S.C. 154(b) by 119 days.

(21) Appl. No.: 14/812,206

(22) Filed: Jul. 29, 2015

(65) Prior Publication Data

US 2017/0028946 A1    Feb. 2, 2017

(51) Int. Cl.
| | |
|---|---|
| *B60R 16/023* | (2006.01) |
| *G06F 9/445* | (2006.01) |
| *B60W 10/04* | (2006.01) |
| *B60W 10/10* | (2012.01) |
| *B60W 30/18* | (2012.01) |

(52) U.S. Cl.
CPC ............ *G06F 8/61* (2013.01); *B60R 16/0231* (2013.01); *B23P 2700/50* (2013.01); *B60W 10/04* (2013.01); *B60W 10/10* (2013.01); *B60W 30/18181* (2013.01); *Y10T 29/49716* (2015.01); *Y10T 29/49778* (2015.01)

(58) Field of Classification Search
CPC ... B60R 16/0231; B60W 10/04; B60W 10/10; B60W 30/18181; Y10T 29/49716; Y10T 29/4973; Y10T 29/49771; Y10T 29/49778; B23P 2700/50
See application file for complete search history.

(56) References Cited

U.S. PATENT DOCUMENTS

2008/0140278 A1*  6/2008  Breed .................... G07C 5/008
                                                                  701/31.4

\* cited by examiner

*Primary Examiner* — Jermie Cozart
(74) *Attorney, Agent, or Firm* — Middleton Reutlinger

(57) ABSTRACT

The present invention is a system and method for reprogramming a vehicle engine or transmission control unit to receive and store setpoint data where the vehicle electronic control unit was not configured to receive and store aftermarket setpoint data prior to being reprogrammed. The method comprising the steps of modifying enclosure of the vehicle electronic control unit to allow access to a memory device by a reprogramming device, placing a reprogramming device in electrical connection to the memory device, reprogramming the memory device and modifying the enclosure a second time to render it weather proof.

21 Claims, 8 Drawing Sheets

METHOD FOR REPROGRAMMING A VEHICLE ELECTRONIC CONTROL UNIT

TECHNICAL FIELD

Exemplary embodiments of the present invention relate generally to systems and methods for modifying a Vehicle Electronic Control Unit.

BACKGROUND AND SUMMARY OF THE INVENTION

Vehicle Electronic Control Units (ECUs) are well known in the art and have replaced many previously mechanical control systems as well as enabling new vehicle functionalities. An ECU is essentially a dedicated computer system that executes software instructions to regulate vehicle systems. This regulation is generally performed using certain setpoints and control curve data stored in an electronic memory portion of the ECU. An ECU is generally integrated into a vehicle's electrical system and may control functions such as engine and transmission operation. For example, ECUs may monitor engine parameters and adjust fuel levels and ignition timing to optimize certain engine characteristics. The optimized characteristics may include engine behavior to improve drivability. ECUs may also be used to control the functions of a vehicle's transmission. In the case of transmissions, an ECU may control such functions as a transmission's shift points and engagement of clutch mechanisms. Generally, these engine and transmission characteristics are selected by the manufacturer of a vehicle to optimize certain characteristics that the manufacturer deems most important. For instance, to improve vehicle performance, a manufacturer may adjust engine characteristics and transmission shift points. Such adjustments may enhance certain vehicle characteristics but may make the vehicle less enjoyable to drive than a similar vehicle without such adjustments.

Enthusiasts have long sought to improve the performance of motor vehicles. In times before the widespread use of ECUs, enthusiasts improved vehicle performance by replacing or modifying vehicle components. For example, to increase engine performance, distributor components could be replaced to alter the ignition timing of an engine in response to engine speed or loading. Similarly, carburetors could be replaced or modified to provide an increased level of fuel flow, improved fuel/air mixture, or faster throttle response. With the advent of ECUs, enthusiasts were initially unable to adjust parameters by replacing parts as they had done prior to the introduction of ECUs. Within a relatively short time, electronic devices were developed that could alter setpoints used by an ECU's control software to control the various vehicle systems. Initially, these devices were integrated circuits that replaced those found in the ECU. In such an instance, a user would access the ECU and replace electronic components located on a printed circuit board. As technology progressed, ECUs incorporated memory devices that could be electrically reprogrammed while installed in a printed circuit board. Devices became available that could reprogram the setpoints stored in the electrically reprogrammable memory devices present in the ECU. These devices were configured to connect to a vehicle's diagnostic port by the user. Using such a device, a user could easily change the operating characteristics of a vehicle without requiring direct access to the ECU for parts replacement. Certain manufacturers have produced ECUs that are unable to be reprogrammed in such a manner. What is needed is a system and method for enabling reprogrammability of ECUs for such ECUs that are not reprogrammable as produced or configured by the vehicle manufacturer.

In embodiments of the invention, an ECU may be modified to transform an ECU that is configured to prevent aftermarket programming by accessing the circuitry of the computer directly at the printed circuit board level and reprogramming that circuitry with a programming device. Such a programming device may be connected directly to one or more integrated circuits mounted on a control board located within the ECU.

Further features and advantages of the devices and systems disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Figure 1:
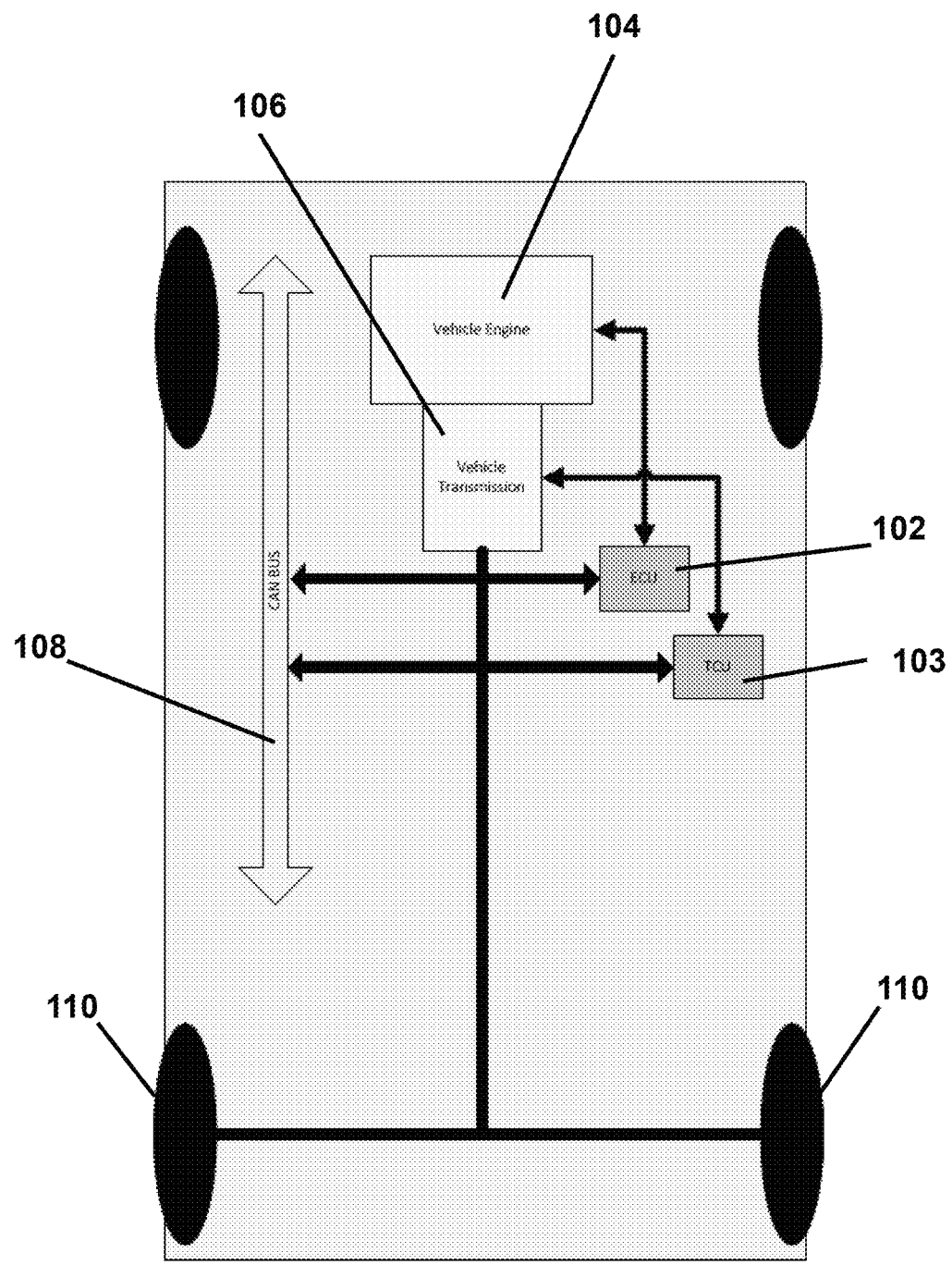
FIG. 1 is a block diagram illustration of an ECU and TCU in communication with various vehicle systems.

FIG. 1 illustrates a high level diagram of a typical vehicle control system. As is illustrated, an engine control unit (ECU) 102 is used to provide control inputs to the engine 104 and a transmission control unit (TCU) 103 may be used to provide control inputs to the transmission 106. The ECU and TCU may be in communication with a controller area network (CAN) bus 108. The CAN bus may be in communication with other vehicle sensors to provide the information needed by the ECU and TCU to manage the vehicle in a manner that results in desired driving characteristics. For example, the ECU may receive operating information from the engine 104 and in turn, provide control outputs to engine systems in order to manage the engine operating characteristics. Two example control outputs may be ignition timing and fuel injection control. The TCU 103 may receive operating information from the transmission 106 and drive wheels 110. The TCU 103 may use information received from the ECU 102 and drive wheels to control the transmission behavior. For example, at certain vehicle and engine speeds a TCU 103 may lock a clutch equipped torque coupling to the engine to increase fuel economy. In other embodiments, a TCU 103 may detect wheel spin at a drive wheel 110 and send a request to the ECU in order to adjust the output power of the engine 104 to reduce the loss of traction and the resultant wheel spin. In addition to the ECU, TCU, and various vehicle sensors, the CAN bus may also be in communication with a vehicle diagnostic port. An example of such a port is an On Board Diagnostic II (OBD-II) Port.

In certain automobiles, an original equipment manufacturer may configure the characteristics of the ECU control outputs to optimize gas mileage while maintaining vehicle emissions at acceptable levels. These configurations are generally accomplished through the use of setpoints and setpoint curves comprised within a memory storage location of the ECU 102. These setpoints and setpoint curves may be programmed into the memory storage location during its manufacturing process. In other embodiments, the setpoints may be programmed during the assembly of the vehicle in which the ECU 102 is to be installed. A user or owner of the vehicle may desire to modify the setpoints and setpoint curves to change the interaction between various vehicle components in order to improve the vehicle performance. Because improvements in performance may result in reduced fuel economy, additional component wear and reduced drivability in certain conditions (for example wet or slippery road surfaces), a user of the vehicle may desire to adjust the ECU setpoints and setpoint curves to satisfy various performance requirements and conditions. A convenient method of doing this involves a setpoint modification interface device in communication with an ECU through the vehicle's electrical system. Methods of connecting a setpoint modification interface device to an OBD-II Port are known in the art. However, certain ECUs are not configured from the manufacturer to allow such a connection. A person ordinarily skilled in the art will understand that certain vehicles may combine the ECU and TCU into a single electronic module. The following discussion refers to an ECU but it will be understood that the disclosed embodiments are equally applicable to an ECU, a TCU, or a combined module, often referred to as powertrain control module (PCM).

Figure 2:
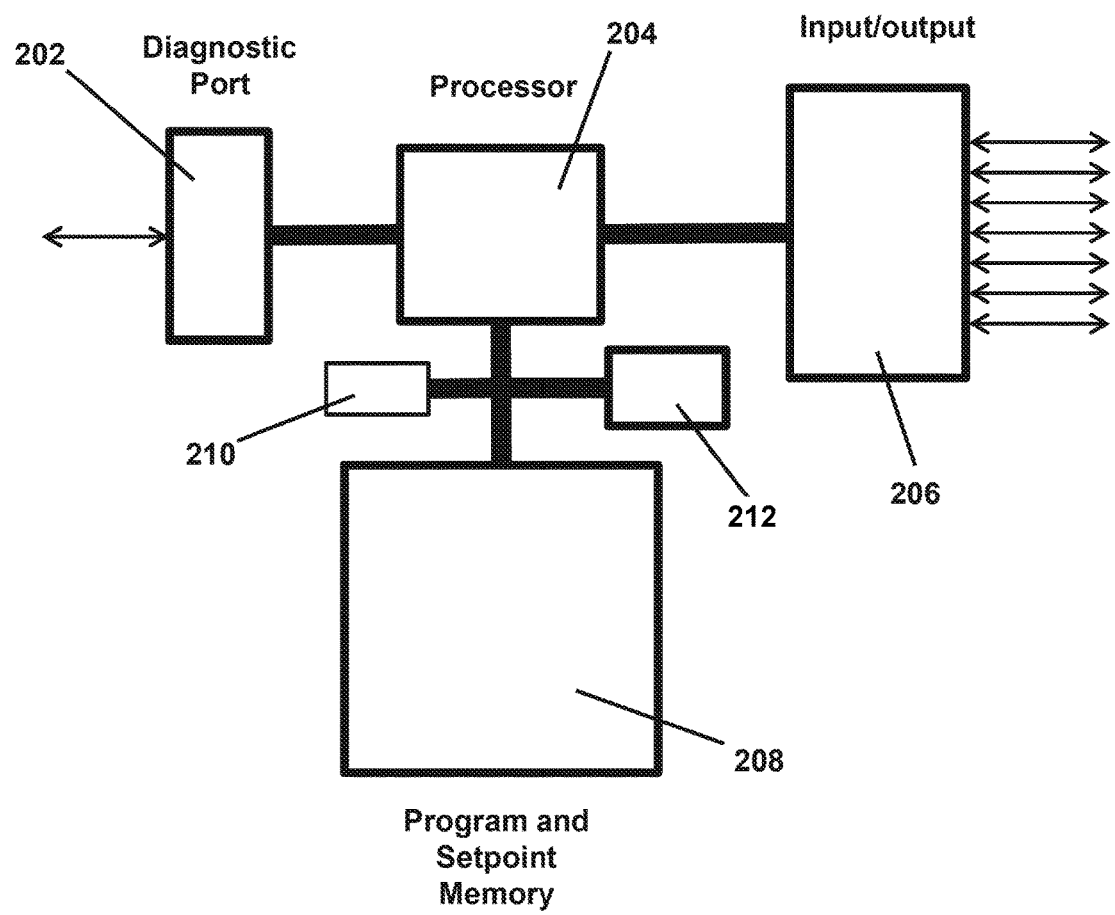
FIG. 2 is a block diagram of an exemplary ECU.

In order to assist the reader in understanding the invention, a simplified diagram of an engine controller is illustrated in FIG. 2. As is shown, a diagnostic port connection 202 is in electronic communication with a processor 204. The processor 204 is in electronic communication with an input/output interface 206 and electronic memory 208. Certain ECUs may be configured to include a programming communication port 210. Certain ECUs may be configured such that one or more of these components may be comprised within a single integrated circuit device. For example, in one possible configuration, a diagnostic port connection 202, a processor 204, and the memory 208 may be combined into one integrated circuit package. As is illustrated, the memory 208 may be electrically connected such that it is not directly connected to the diagnostic port connection 202. Thus, software instructions must be present in order to allow setpoint data to flow from the diagnostic port 202 and be stored in the memory 208. Many manufacturers provide such instructions to allow for updates to the ECU from the diagnostic port. However, other manufacturers do not provide access to setpoints and setpoint curves. In such a case, the memory 208 must be accessed directly with an electronic programming device. Once access to the memory 208 has been obtained, the electronic programming device may be used to add program instructions that when executed configure the processor to receive valid setpoint data from the diagnostic port or other input and store the data to the memory 208. The programming instructions required will depend upon the existing program instructions found in the memory 208 and also the characteristics of the controller and memory devices used in the ECU. Once the necessary program instructions have been added, a user may access the diagnostic port with an electronic interface device to modify the setpoint data as desired.

Figure 3:
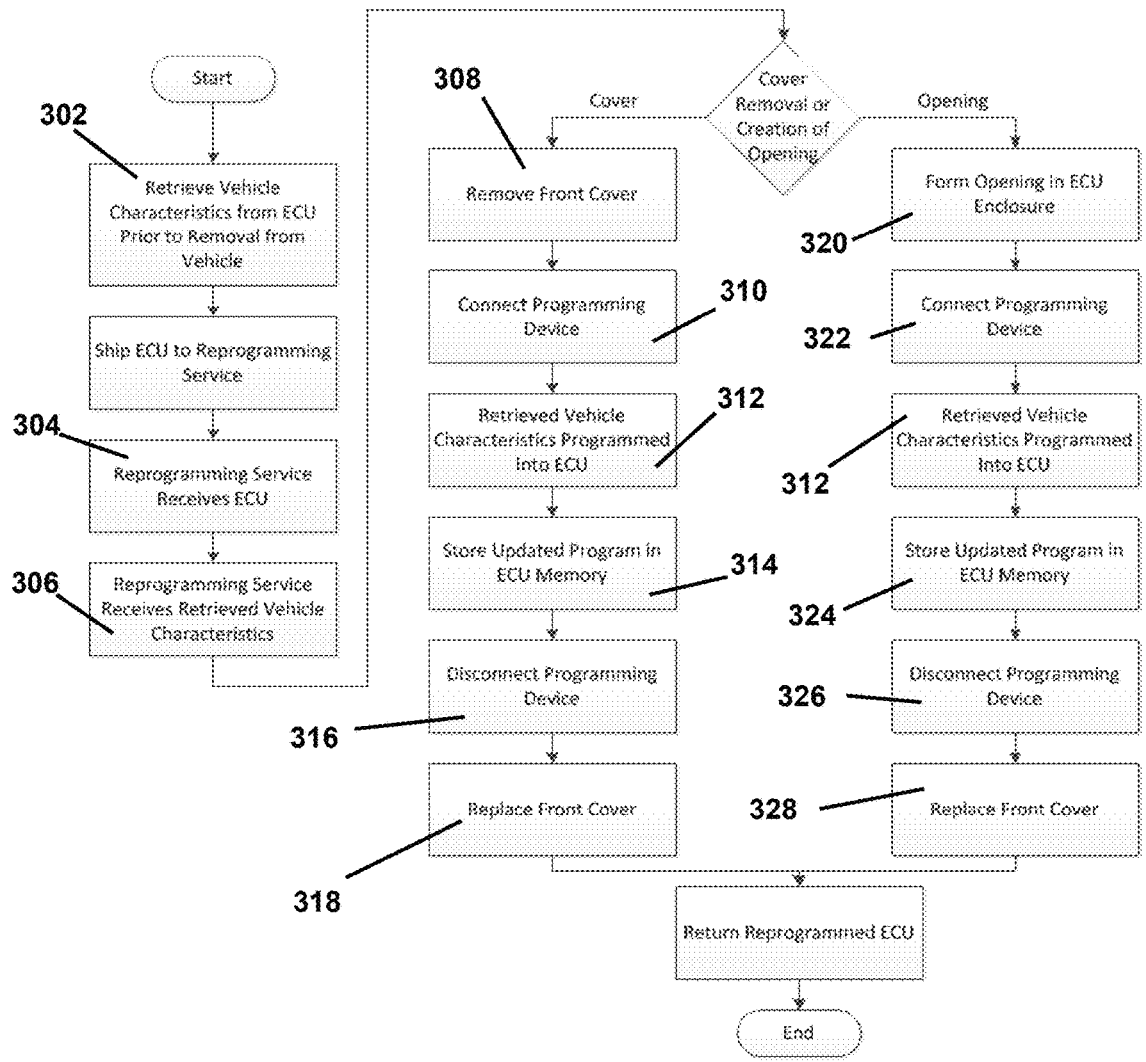
FIG. 3 is a flow chart illustrating steps performed in an embodiment of the invention.

In an embodiment of the invention, the reprogramming procedure may reconfigure the ECU to load and store any file onto its flash memory device. Once the ECU has been reprogrammed, the change may be made permanent. The reprogramming procedure may also reconfigure vehicle specific information onto an external memory device 212. Referring to the flowchart of FIG. 3, in an embodiment of the invention, an ECU removed from a vehicle may be received for reprogramming by an entity performing the reprogramming. Prior to its removal from the vehicle, vehicle characteristics data may be retrieved from the ECU and stored 302. When an ECU is received by the entity 304 performing the reprogramming those retrieved and stored vehicle characteristics may also be received 306. This vehicle characteristics data may comprise vehicle configuration, operation setpoints, and identification information. During a reprogramming process, these characteristics may be programmed to the ECU 312 in order that the reprogrammed ECU retains the vehicle characteristics required to perform properly when the ECU is reinstalled in the vehicle from which it was removed.

In certain embodiments of the invention, the electronic programming device may be connected directly to the memory 208 and also to a memory programming communications port located on the printed circuit board. Each connection may require more than one actual electronic connection to the memory and communications port. For example, the communications port may require an electronic connection to enable device programming, another to store the programmed data in the memory device, and additional connections to provide electrical power to the device to be programmed. Connections to the memory device may vary depending on the programming interface.

Figure 4A:
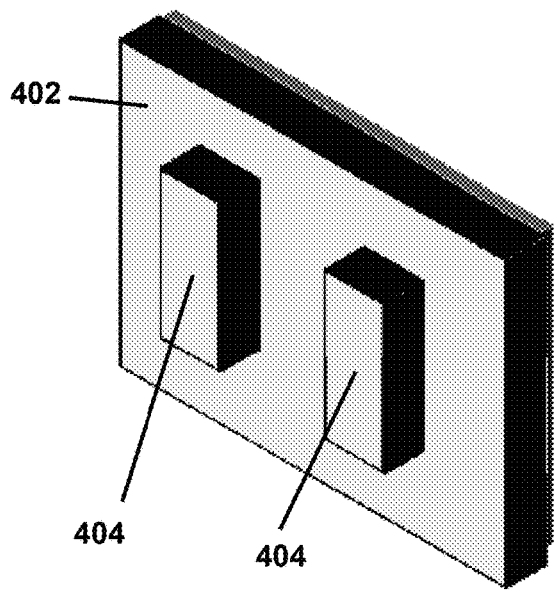
FIGS. 4a-4c are illustrations of an embodiment of an ECU.
Figure 4B:
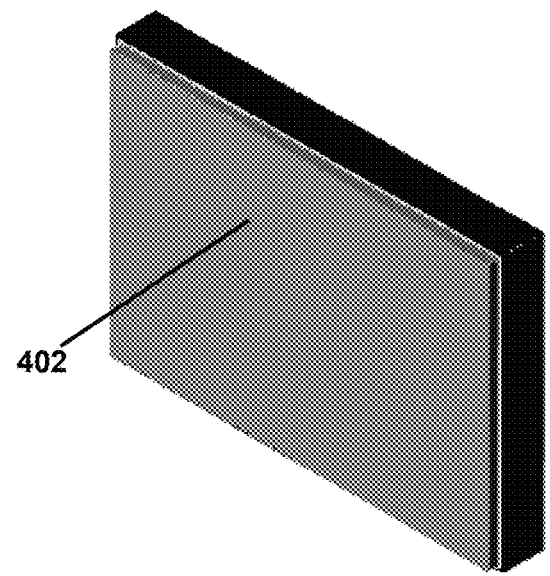
Figure 4C:
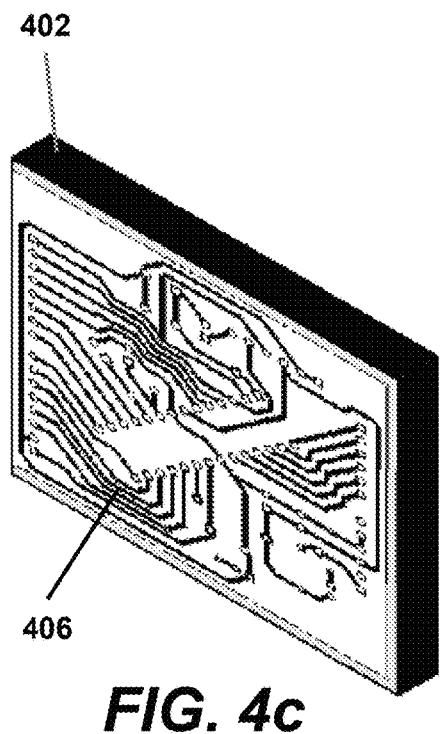
Figure 5:
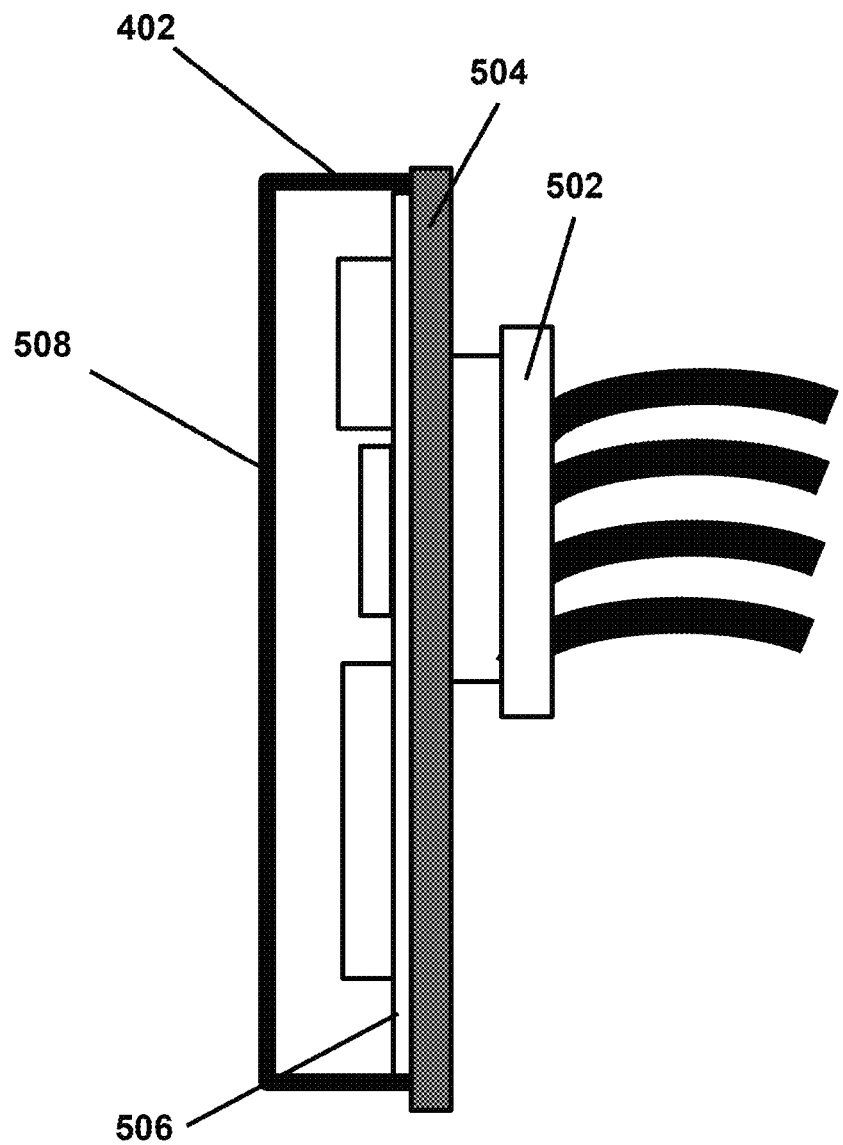
FIG. 5 is a side-view cutaway illustration of an embodiment of an ECU.
Figure 6:
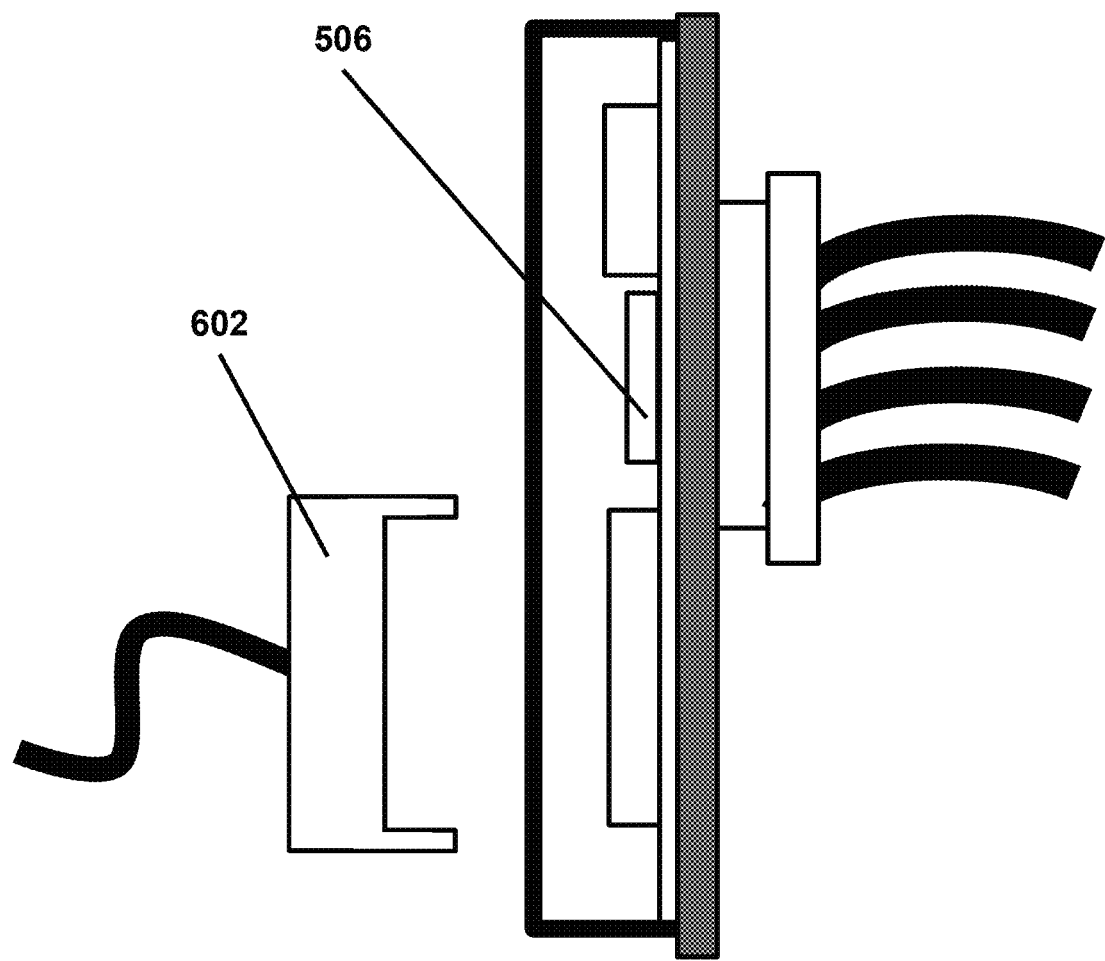
FIG. 6 is an illustration of an embodiment of an ECU and a programming device.
Figure 7:
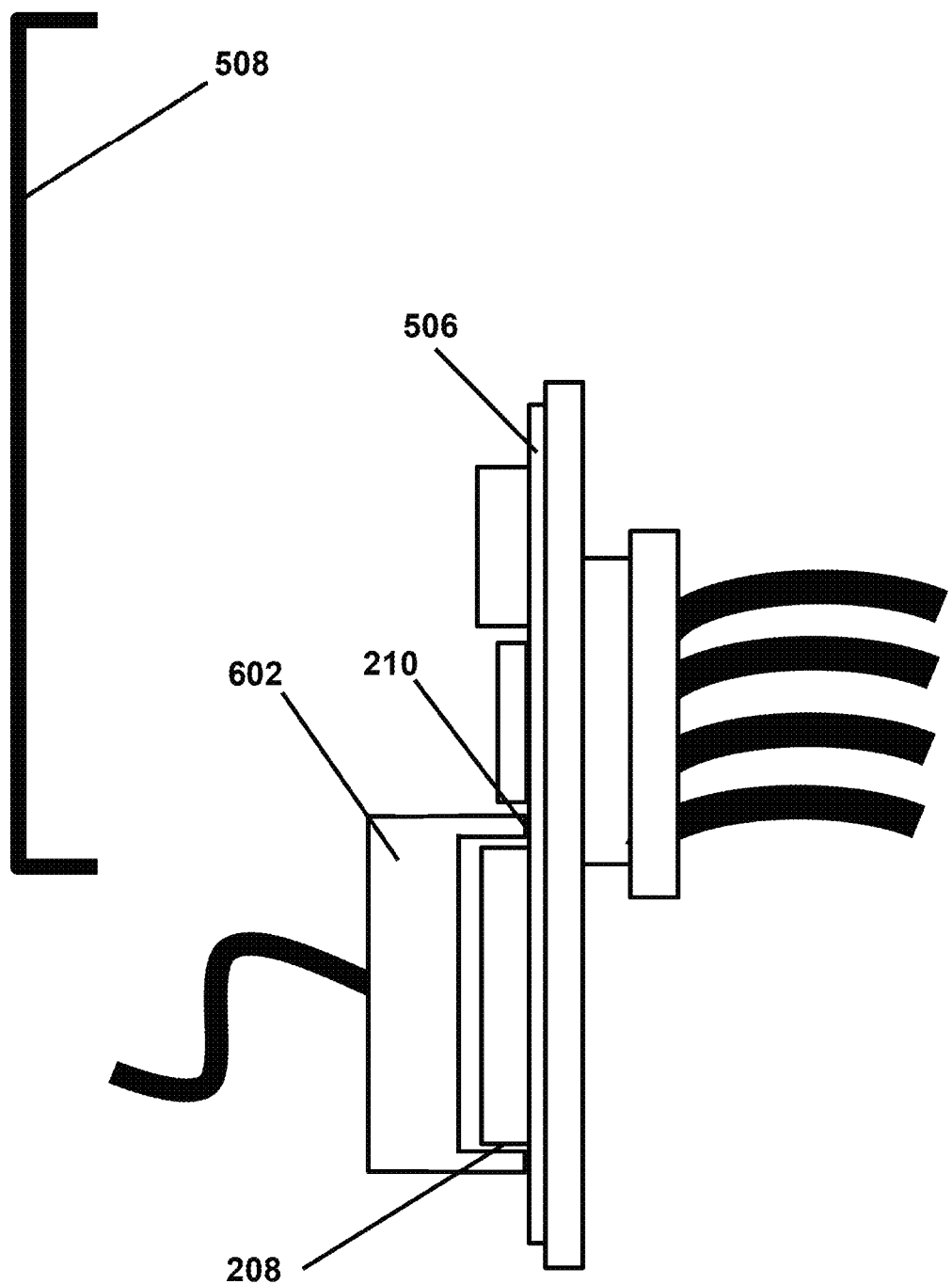
FIG. 7 is an illustration of an embodiment of the invention showing a programming device in direct electronic communication with an integrated circuit component located in the ECU.
Figure 8:
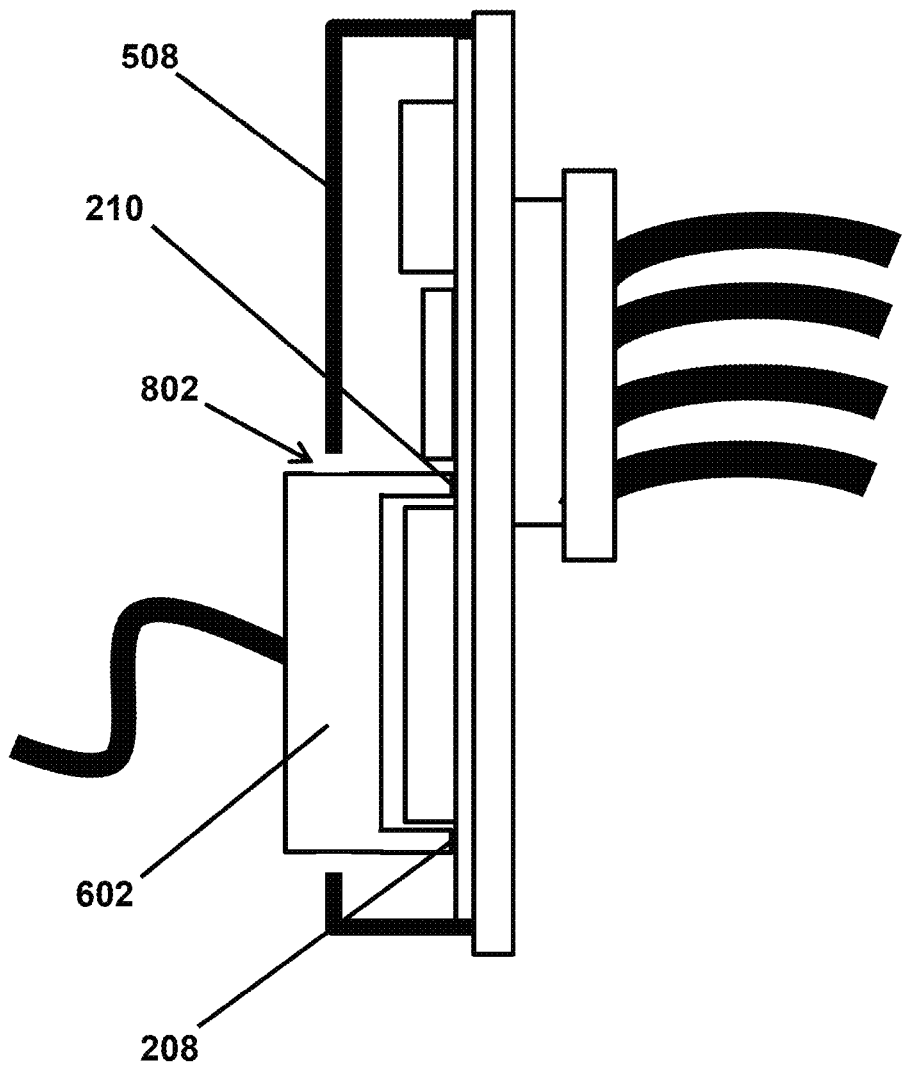
FIG. 8 is an illustration of an embodiment of the invention showing a programming device inserted into an opening formed in the enclosure of an ECU.

In order to obtain access to the memory, embodiments of the invention may require structural modification of the ECU. An example ECU is illustrated in FIGS. 4a - 4c. As shown in FIG. 4a, an ECU 402 may be equipped with one or more connectors 404. As shown in FIG. 4b, the control computer 402 may be completely enclosed in a protective enclosure in order to protect the computer from environmental contaminants. As is shown in FIG. 4c, removal of a portion of the enclosure reveals a printed circuit board 406 that comprises various electronic devices. FIG. 5 is a side cutaway view of an example ECU 402. Illustrated is a connector to the vehicle wire harness 502, a rear portion of the controller enclosure 504, a printed circuit board 506 and a front portion of the controller enclosure 508. As illustrated in FIG. 6, an electronic programming device 602 may be prevented from accessing components on the printed circuit board 506 by the front portion of the controller enclosure in the illustrated embodiment. In an embodiment of the invention illustrated in FIG. 7, the front portion of the controller enclosure 508 has been removed (step 308 of the flowchart of FIG. 3). Once the front portion is removed, the electronic programming device 602 may be positioned such that it makes contact with the memory 208 and a programming communications port 210 (step 310). When the necessary modified program instructions are stored in the memory 208 (step 314), the programming device 602 may be disconnected (step 316) from the printed circuit board 506 and the front portion of the controller enclosure may be replaced in step 318. Referring again to the flowchart of FIG. 3 and as illustrated in FIG. 8, other embodiments of the invention may comprise an opening 802 formed (step 320) in the front portion of the controller enclosure 508. The programming device 602 may be positioned so that it makes contact with the memory 208 and a programming communications port (step 322). When the necessary program instructions are stored in the memory 208 (step 324), the programming device 602 may be removed (step 326) and a cover placed over the opening 802 (step 328) such that the vehicle computer is rendered weathertight if required by the vehicular application.

To ensure that the ECU is returned to a weathertight condition, in certain embodiments of the invention an adhesive may be placed around the edge of the ECU's printed circuit board 506. The front portion of the controller enclosure 508 may then be replaced to cover the printed circuit board 506 and pressed against the adhesive to hold the front portion in place as the adhesive dries. In an embodiment of the invention in which an opening is created within the ECU's cover, a grommet may be used to fill this opening and a sealant placed around the grommet to restore the ECU's weathertight condition.

In embodiments where access to the printed circuit board 506 is required at the rear of the printed circuit board, an opening for the programming device may be formed in the rear portion of the controller enclosure 504. As with an opening in the front portion of the enclosure, an opening formed in the rear portion of the controller enclosure may require a cover to be placed over the opening, as previously described, when the required storage of programming instructions is completed.

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. A method for enabling an Electronic Control Unit (ECU) to be reprogrammed comprising the steps of:
   obtaining an Electronic Control Unit (ECU) which comprises an enclosure, a printed circuit board enclosed by said enclosure, a plurality of vehicle setpoints, program instruction steps, and at least one vehicle wire harness connector;
   modifying the Electronic Control Unit (ECU) enclosure to allow physical access to components on the printed circuit board;
   placing a printed circuit programming device in electronic communication with at least one semiconductor component on said printed circuit board; and
   causing the printed circuit programming device to permit software instructions to be uploaded such that they modify the program instruction steps to allow said vehicle setpoints to be updated from said wire harness connector.

2. The method of claim 1, where the step of modifying the Electronic Control Unit (ECU) enclosure comprises the steps of removing a cover portion of the enclosure in a manner that allows the removed portion to be replaced.

3. The method of claim 2, further comprising the steps of replacing the removed cover portion after the programming device uploads modified data.

4. The method of claim 1, where the step of modifying the Electronic Control Unit (ECU) enclosure comprises forming an access point in a portion of the controller in proximity to the at least one semiconductor component.

5. The method of claim 4, further comprising the step of applying a weather resistant cover to the access point after the programming device uploads the software instructions.

6. The method of claim 1, wherein placing the printed circuit programming device in electronic communication with at least one semiconductor component comprises the sub steps of connecting the printed circuit programming device to an external memory device and connecting the printed circuit programming device to an onboard communications port configured for programming of a flash memory device.

7. The method of claim 1, wherein the uploaded software instructions further modify the program instructions to allow valid vehicle setpoints to be updated from a vehicle diagnostic port in communication with said wire harness connector.

8. A method of programming a vehicle electronic control unit comprising the steps of:
   receiving the vehicle electronic control unit;
   receiving permission from an owner of the vehicle electronic control unit to program the vehicle electronic control unit;
   receiving vehicle specific data read from the vehicle electronic control unit;
   modifying an enclosure of the vehicle electronic control unit to provide access to a printed circuit board contained within the vehicle electronic control unit;
   connecting a read/write device to at least one electrical component located on the printed circuit board;
   determining if reprogramming of the vehicle electronic control unit is required in order to permit reprogramming using an On Board Diagnostic II (OBD-II) port in communication with the electronic control unit;
   reprogramming the vehicle electronic control unit using the read/write device; and
   modifying the previously modified enclosure to cause the enclosure to become at least as weathertight as the enclosure was prior to being previously modified.

9. The method of claim 8, where the electronic control unit is an engine control unit.

10. The method of claim 8, where the electronic control unit is a transmission control unit.

11. The method of claim 8, where the electronic control unit is a Powertrain control module.

12. The method of claim 8, wherein the step of modifying the enclosure to provide access comprises the sub step of removing a cover portion of the enclosure and the sub step of modifying the previously modified enclosure comprises the sub step of reattaching the removed cover portion.

13. The method of claim 8, wherein the step of modifying the enclosure to provide access comprises the sub step of forming an opening in a portion of the enclosure adjacent to the printed circuit board and the step of modifying the previously modified enclosure comprises the sub step of attaching a weather resistant cover over the previously formed opening.

14. The method of claim 8, wherein the read/write device is connected to an external memory device and an onboard communications port configured for programming of a flash memory device within the vehicle electronic control unit.

15. The method of claim 8, wherein the step of reprogramming the vehicle electronic control unit comprises the sub steps of:
 writing programming instructions to the vehicle electronic control unit that configures the vehicle electronic control unit to accept and store valid setpoints provided to the electronic control unit from the On Board Diagnostic II (OBD-II) port; and
 storing the received vehicle specific data to the vehicle electronic control unit.

16. The method of claim 15, wherein the step of modifying the enclosure to expose the printed circuit board comprises the sub step of removing a cover portion of the enclosure and the step of modifying the previously modified enclosure comprises the sub step of reattaching the removed cover portion.

17. The method of claim 15, wherein the step of modifying the enclosure to expose the printed circuit board comprises the sub step of forming an opening in a portion of the enclosure adjacent to the printed circuit board and the step of modifying the previously modified enclosure comprises the sub step of attaching a weather resistant cover over the previously formed opening.

18. A method of programming an electronic control unit for use in a vehicle, comprising the steps of:
 receiving the electronic control unit;
 receiving vehicle specific data read from the electronic control unit;
 modifying an enclosure surrounding the electronic control unit to expose a printed circuit board contained within the electronic control unit;
 attaching at least one connection of a read/write device to a component located on the printed circuit board;
 storing program instructions to the electronic control unit using the read/write device that, when executed by the electronic control unit, configure the electronic control unit to receive and store setpoint data provided by a diagnostic port in electronic communication with the electronic control unit; and
 modifying the previously modified enclosure to cause the enclosure to be at least as weathertight as it was when received.

19. The method of claim 18, where the electronic control unit is an engine control unit.

20. The method of claim 18, where the electronic control unit is a transmission control unit.

21. The method of claim 18, where the electronic control unit is a powertrain control module.

\* \* \* \* \*